United States Patent
Kube et al.

(10) Patent No.: US 8,387,887 B2
(45) Date of Patent: Mar. 5, 2013

(54) INDUCTIVELY COUPLED RADIO FREQUENCY IDENTIFICATION (RFID) TRANSPONDER

(75) Inventors: Roland Kube, Zimdorf (DE); Bernd Stadelmann, Egloffstein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/216,902

(22) Filed: Aug. 24, 2011

(65) Prior Publication Data
US 2012/0048947 A1 Mar. 1, 2012

(30) Foreign Application Priority Data
Aug. 24, 2010 (EP) .................................... 10173836

(51) Int. Cl.
*G06K 19/06* (2006.01)
(52) U.S. Cl. ....................................................... 235/492
(58) Field of Classification Search .................... 235/492
See application file for complete search history.

(56) References Cited

U.S. PATENT DOCUMENTS
2009/0295036 A1* 12/2009 Zimmerman ............ 264/331.11
2010/0308965 A1    12/2010 Weitzhandler et al.

FOREIGN PATENT DOCUMENTS
| AU | 2002342750 | 4/2003 |
| DE | 69324093 | 9/1999 |
| WO | WO 03/030093 | 4/2003 |
| WO | WO 2009/050662 | 4/2009 |

* cited by examiner

*Primary Examiner* — Kristy A Haupt
(74) *Attorney, Agent, or Firm* — Cozen O'Connor

(57) ABSTRACT

An RFID transponder comprising a housing for mounting on or in a workpiece having a metallic surface, where the RFID transponder is provided for inductive coupling to an RFID reader, where that side of the RFID transponder which is to face the metallic surface is provided with a ferrite component for guiding the magnetic flux from and to a side of the RFID transponder which is to face away from the metallic surface, and where the ferrite component comprises a composite material composed of a first plastic and ferrite powder and forms a first part of the housing, which is to face the metallic surface. Such an RFID transponder is small and robust and additionally simple to produce.

7 Claims, 1 Drawing Sheet

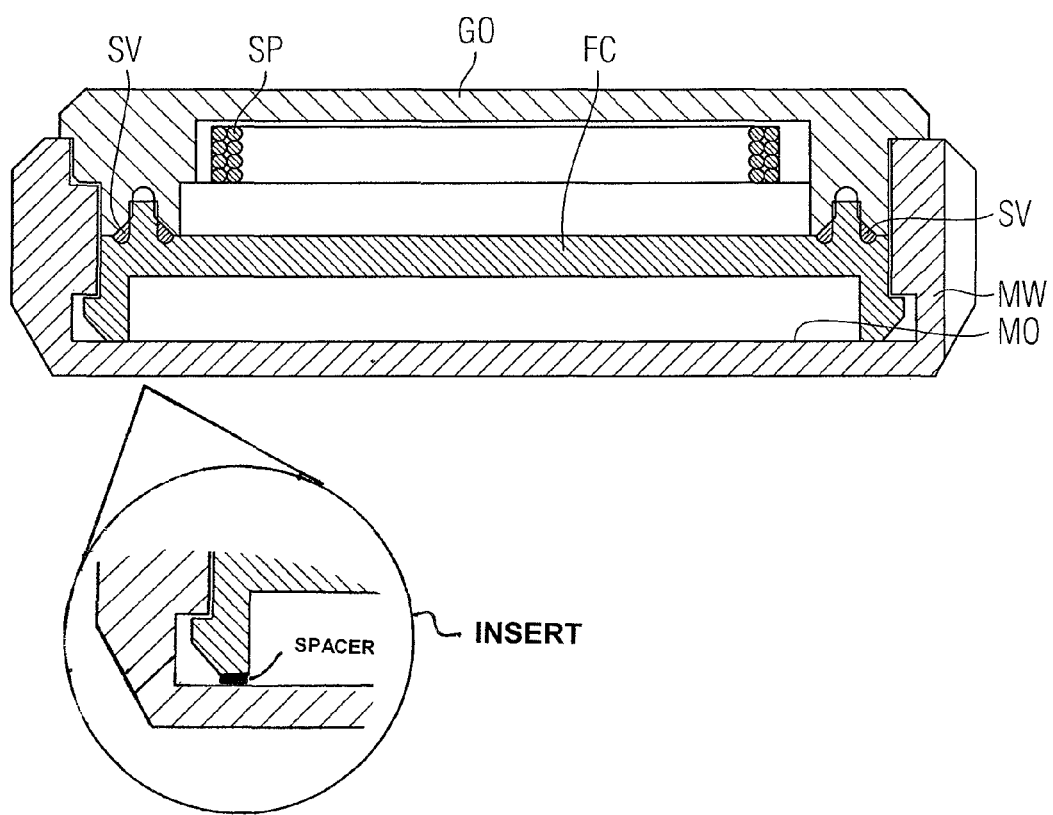

INDUCTIVELY COUPLED RADIO FREQUENCY IDENTIFICATION (RFID) TRANSPONDER

BACKGROUND OF THE INVENTION

1. Field of the Invention

The invention relates to Radio Frequency Identification (RFID) Transponders and, more particularly, to an RFID transponder comprising a housing for mounting on or in a workpiece having a metallic surface.

2. Description of the Related Art

Mobile data memories that can be read contactessly are often used for identifying goods, machines and other articles. Here, optically readable barcode labels are increasingly being replaced by electromagnetically or magnetically writeable and readable radiofrequency identification (RFID) labels, i.e., RFID transponders. In preferred configurations, these RFID transponders operate without a dedicated power supply, such as a battery.

Different technologies are used in RFID transponders depending on the case of use. Thus, for labeling garments and other far field applications, for example, the RFID transponders are coupled to the reader by radio, i.e., by electromagnetic waves. However, inductively coupled RFID transponders will be considered below. These can be coupled to a writing and reading device, reader for short, by an alternating magnetic field and are often used in industrial applications in which short distances have to be bridged (i.e., near field detection).

Inductively coupled RFID transponders regularly have one or more transmitting and receiving coils by which the magnetic flux generated by a reader is converted into an AC voltage, where the AC voltage initially supplies the operating electronics of the RFID transponder with energy, and then contains information transmitted from the reader to the RFID transponder and information transmitted from the RFID transponder to the reader. With respect to the function of the RFID transponder, it is essential that the magnetic flux generated by the reader is substantially conducted through the area of the coil. However, this is problematic in cases in which the RFID transponder is operated on a metallic surface or in a depression in a metallic workpiece. In these cases, often a large portion of the magnetic flux is conducted through the metallic workpiece and laterally past the transmitting and receiving coil (or simply coil), where the energy of the alternating magnetic field is largely converted into heat by eddy current losses and is therefore no longer available for supplying the RFID transponder. Conversely, the emissions of the RFID transponder in the case of an arrangement on a metallic workpiece are also allowed to be conducted directly into the metallic workpiece, such that an undesirable attenuation can likewise be observed.

In order to solve the foregoing problem, it is known to provide between the transmitting and receiving coil of the RFID transponder and a metallic surface or a metallic workpiece a ferrite core (this also includes plate-shaped and pot-shaped components composed of ferrite material). As a result, the magnetic flux, i.e., the magnetic field lines, substantially coming from a receiving side opposite to the metallic workpiece, are conducted through the area of the transmitting and receiving coil and are thereafter conducted away from the metallic workpiece to the receiving side again.

However, the introduction of a ferrite core has disadvantages. Thus, the mounting of this component is an additional manufacturing step, where it is often necessary to provide separate spacers for spacing apart the ferrite core with respect to the metallic surface of the metallic workpiece. Ferrite cores furthermore have the disadvantage that they are very brittle and can therefore hardly be processed subsequently by a user. Consequently, ferrite cores usually have to be procured from a manufacturer in their finally required form, such that a subsequent change in the design of the RFID transponder, for example, changes in the dimensions of the coil or of a housing, have the effect that a new series of ferrite cores has to be designed, ordered, manufactured and supplied. The mounting of the ferrite cores is also associated with expenditure because there is the risk of cracks and fractures because of the brittle material. An already completed transponder having such a ferrite core is also sensitive to mechanical effects that can lead to cracks and fractures in the ferrite and thus to a deterioration in the maximum reading and receiving distance (range). Therefore, it is customary to encapsulate the transponders with ferrite cores in impact-resistant plastic housings which absorb the mechanical loads. However, this increases the structural size of the RFID transponders constructed in this way.

SUMMARY OF THE INVENTION

It is therefore an object of the present invention to provide an alternative to the ferrite cores used in a radio frequency identification (RFID) transponder that is cost-effective and simple and flexible to manufacture, is mechanically robust, and leads to a reduced structural size of an RFID transponder.

These and other objects and advantages are achieved in accordance with the invention by providing, for guiding the magnetic flux in RFID transponders, a component comprising a ferrite compound, i.e., a plastic injection-molding mixture composed of a polyamide and a ferrite powder.

In accordance with the invention, an RFID transponder comprising a housing for mounting on or in a workpiece having a metallic surface is provided, where the RFID transponder is provided for inductive coupling to an RFID reader, and where that side of the RFID transponder which is to face the metallic surface is provided with a ferrite component for guiding the magnetic flux from and to a side of the RFID transponder which is to face away from the metallic surface. Here, the ferrite component consists of a composite material composed of a first plastic and ferrite powder and forms a first part of the housing, which first part is to face the metallic surface. Such an RFID transponder can be produced cost-effectively even in small numbers because the shaping for the ferrite component can be defined by the simple configuration of a mold for plastic injection molding. Such an RFID transponder, both during manufacture and when it is used, is significantly more robust with respect to mechanical effects than an RFID transponder comprising a conventional ferrite core. Moreover, in the case of such an RFID transponder configured in accordance with the invention, the ferrite component can perform the function of the housing part facing the metallic workpiece, such that there is no need to provide a further housing on this side of the RFID transponder.

In an embodiment, the RFID transponder is configured such that the housing has at least one second part for covering the RFID transponder in a transmitting and receiving direction, where the second part of the housing is formed from a second plastic and where the first and the second part are connected to one another. As a result, a closed, water-tight and dust-proof housing is attained.

Advantageously, for both halves of the housing, i.e., both for the ferrite component and for the covering lying opposite, it is possible to use a polyamide, where polyamide firstly can be processed in a simple manner, and secondly has a good resistance to mechanical and chemical ambient influences. A further advantage is that the two halves of the housing can easily be connected to one another by customary joining methods, in particular by ultrasonic welding. While the ferrite component is manufactured from a plastic, preferably polyamide, with embedded ferrite powder, i.e., with an MnZn admixture, the second half of the housing can be produced from a polyamide with glass fiber reinforcement ("PA-GF"), which further increases the mechanical loadability of the RFID transponder.

The manufacture of the ferrite component by an injection molding method furthermore enables spacers to be integrally formed onto the side facing the metallic workpiece, whereby a significant part of that side of the RFID transponder that faces the metallic workpiece or the metallic surface is spaced apart from the metallic surface. As a result, a significant portion of the magnetic flux is prevented from being conducted into the metallic workpiece. As a result of the spacers being integrally formed onto the ferrite component, the separating mounting step otherwise required for this purpose is advantageously obviated.

A smaller structural height of the RFID transponder and better guidance of the magnetic flux are achieved if the ferrite component has, at its side facing the RFID transponder, a substantially ring-shaped depression for receiving the transmitting and receiving coil. Production by an injection molding method makes it possible to produce such a depression with virtually any desired geometry without an additional manufacturing step.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of an RFID transponder according to the invention is described below with reference to the drawing, in which:

The FIGURE shows, in a schematically simplified illustration, a section through an RFID transponder in accordance with the invention.

DETAILED DESCRIPTION OF THE PREFERRED EMBODIMENTS

The FIGURE is a cross-sectional view illustrating a metallic workpiece MW composed of a ferromagnetic material having a metallic surface MO. Here, the metallic workpiece MW is only illustrated partially, that is to say in a region having a depression for receiving an RFID transponder. Instead of the configuration of a depression for receiving or for latching in an RFID transponder, it is also possible to consider smooth surfaces of metallic workpieces MW, onto which RFID transponders can be adhesively bonded, screwed or fixed in some other way. The RFID transponder has operating electronics (not illustrated here in detail) connected to a transmitting and receiving coil SP. The sectional illustration illustrates only a few windings of the coil SP by way of example. Although the RFID transponder shown here is constructed substantially in a circular manner, i.e., in a rotationally symmetrical manner, in a plan view the coil SP can, for example, also be shaped in a rectangular fashion or in some other geometry.

It should be assumed hereinafter that, in relation to the illustration in the FIGURE, an RFID reader is arranged substantially above the arrangement shown, such that the field lines describing the magnetic flux penetrate substantially perpendicularly through the area spanned by the coil SP, are laterally deflected by a ferrite component FC ("ferrite compound") and are conducted out in the edge region of the ferrite component FC substantially perpendicularly, that is to say upward relative to the drawing, and vice versa.

The ferrite component FC is a plastic injection-molded part composed of a polyamide material with which ferrite particles or ferrite powder, i.e., a zinc-manganese compound, was admixed during production. As a result, the ferrite component is soft-magnetic and therefore has a narrow hysteresis curve. Moreover, the ferrite component is electrically nonconductive, but in return, as described, the ferrite compound is magnetically "permeable".

The RFID transponder, which is substantially formed from the coil SP, the operating electronics (not explicitly illustrated) and the ferrite component FC, furthermore has a second housing part GO (housing upper part) composed of glass-fiber-reinforced polyamide that has no ferrite particles and is therefore magnetically "neutral". The housing part GO is welded to the ferrite component FC by a ring-shaped welding connection SV such that the coil SP and the operating electronics are encapsulated in a water-tight and dust-proof manner. In the present exemplary embodiment, the welding connection SV is produced by ultrasonic welding, thus avoiding undesirable heating of the operating electronics during the joining process. Alternatively, however, the ferrite component FC and the housing upper part GO can also be joined by adhesive bonding, by laser welding or by pressing.

Spacers with respect to the magnetic surface MO are integrally formed on the underside—relative to the illustration in the FIGURE—of the ferrite component FC, which spacers, in this exemplary embodiment, are simultaneously configured as hooks of a plastic snap-action connection which engage into the depression in the metallic workpiece MW. This spacer is not a completely ring-shaped part formed integrally onto the ferrite component FC, but rather a number (here: 2) of individual latching lugs. These comparatively small contact areas between the ferrite component FC and the metallic surface MO in this case ensure that a large portion of the field lines entering and exiting through the area of the coil SP are re-conducted out in the transmitting and receiving direction, and do not penetrate, for instance, into the metallic workpiece MW.

In an alternative embodiment (not illustrated), analogously to the separate housing upper part GO, it is also possible to provide an additional housing lower part (second housing shell), which covers the ferrite component FC at its underside—relative to the FIGURE—or laterally and in this way functions as a spacer (see insert).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention.

What is claimed is:

1. A radio frequency identification transponder for inductive coupling to an RFID reader, comprising:
   a housing for mounting on or in a workpiece having a metallic surface; and
   a ferrite component for guiding the magnetic flux from and to a side of the RFID transponder which is to face away from the metallic surface provided on that side of the RFID transponder which is to face the metallic surface;
   wherein the ferrite component comprises a composite material comprising a first plastic and ferrite powder and forms a first part of the housing which is to face the metallic surface.

2. The RFID transponder as claimed in patent claim 1, wherein the housing includes at least one second part configured to cover the RFID transponder in a transmitting and receiving direction;
   wherein the at least one second part of the housing is formed from a second plastic; and
   wherein the first part of the housing and the at least one second part of the housing are connected to one another.

3. The RFID transponder as claimed in claim 2, wherein at least one of the first plastic and the second plastic is a polyamide.

4. The RFID transponder as claimed in claims 2 and 3, wherein the first housing part and the at least one second housing part are joined by ultrasonic welding.

5. The RFID transponder as claimed in claim 1, wherein the first housing part is an injection molded component.

6. The RFID transponder as claimed in claim 1, wherein at spacers for avoiding contact of the first housing part with an entire area of the metallic surface are integrally formed on the first housing part.

7. The RFID transponder as claimed in claim 1, wherein the first housing part has, on the side facing the RFID transponder, a substantially ring-shaped depression for receiving a transmitting and receiving coil of the RFID transponder.

* * * * *